Nov. 12, 1929.  F. H. BRYANT  1,735,034
DAMPER CONTROL
Filed Oct. 15, 1928
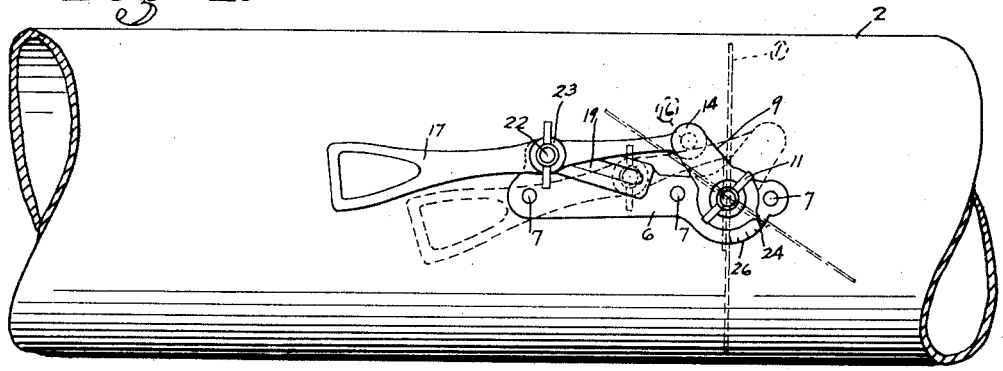
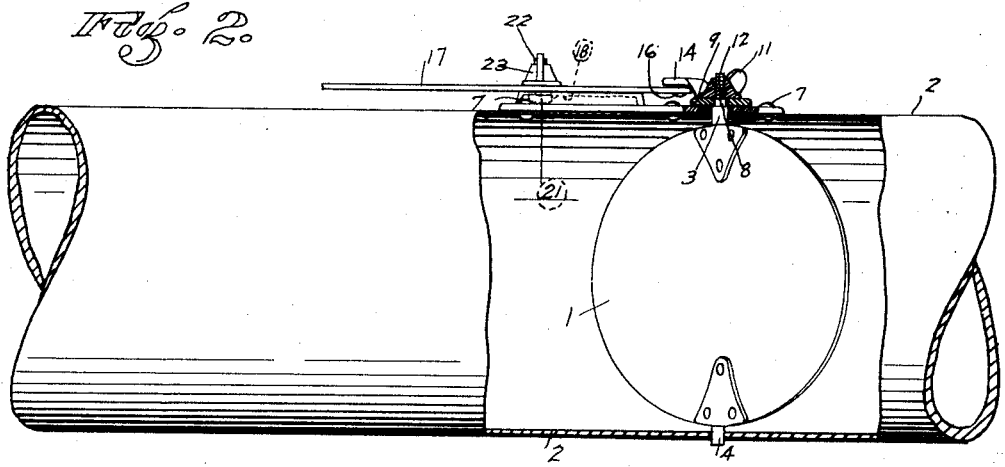
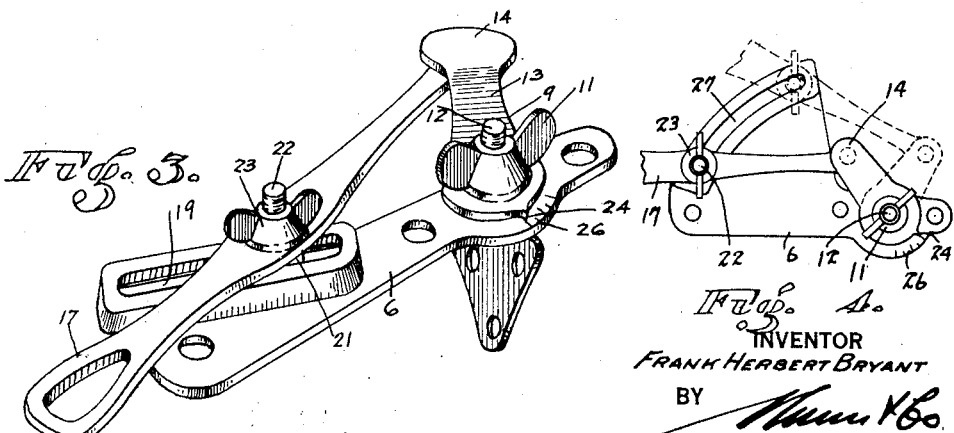
INVENTOR
FRANK HERBERT BRYANT
BY
ATTORNEYS.

Patented Nov. 12, 1929

1,735,034

UNITED STATES PATENT OFFICE

FRANK HERBERT BRYANT, OF MILL VALLEY, CALIFORNIA

DAMPER CONTROL

Application filed October 15, 1928. Serial No. 312,654.

The present invention relates to improvements in damper control and its particular object is to provide a convenient, economical means for controlling a damper in a pipe of any character, reference being had principally to heating or ventilating pipes in large buildings, altho the principle may be employed in connection with any pipe in any suitable situation.

One of the objects of the invention is to provide means for controlling a damper allowing the damper to be locked in any adjusted position. A further object of the invention is to provide a special operating element for the damper control and means for locking the operating element in any adjusted position.

A further object of the invention is to provide means in connection with a damper control allowing a predetermined position to be readily found upon adjustment.

Further objects and advantages of my invention will appear as the specification proceeds.

The preferred forms of my invention are illustrated in the accompanying drawing, in which Figure 1 shows one form of damper control as applied to a horizontal pipe, in top plan view;

Figure 2 the same arrangement partly in vertical section and partly in side elevation;

Figure 3 a perspective view of my damper control; and

Figure 4 a fragmentary plan view of a modified form of damper control.

While I have shown only the preferred forms of my invention, I wish to have it understood that various changes or modifications may be made within the scope of the claims hereto attached without departing from the spirit of the invention.

The damper 1 is journaled in the pipe 2 as shown at 3 and 4 in Figure 2. A guide element 6 is fastened longitudinally to the pipe by means of rivets 7 or in any other suitable manner so as to allow one of the journals to extend therethrough. An extension of the journal 3 is made angular as shown at 8 and a short arm 9 is formed with a corresponding angular perforation into which the angular portion of the journal 3 fits, while a nut 11 may be threaded on the extreme end 12 of the journal for firmly securing and clamping the arm upon the guide element 6 so that when the nut 11 is tightened the damper is held against revolving motion. The arm 9 is bent away from the pipe as shown at 13 and bent again at its extremity as at 14, the said extremity presenting an inwardly extending pin 16, allowing the perforated end of an operating member 17 to engage therewith. By this construction of the arm the operating member is made to slide on an embossment 18 rising from the guide member 6, which latter embossment is slotted as shown at 19, the slot being arranged to run substantially in the direction of the pipe. The embossment is recessed in the bottom to allow the head 21 of a bolt 22 to slide therein and the shank of the bolt extends through the slot and through a perforation in the operating member 17 to receive a nut 23 by means of which the operating member may be clamped upon the embossment for locking the former against motion.

The arm 9 may be provided with a point 24 sliding over a scale 26 for indicating the position of the damper.

To operate the damper both nuts 11 and 23 are loosened and the operating element 17 is pushed forward or backward as the case may be to adjust the damper to the desired position, as indicated by the pointer 24. After the damper has been adjusted both nuts are tightened whereby the damper is firmly held in position.

Particular attention is called to the fact that my arrangement allows the damper itself to be locked in position by the nut 11 whereby any rattling of the damper due to draft passing throught the pipe is prevented. The scale allows an operator to easily find a desired position. The arm is fastened to the damper in such a manner that it may be clamped upon the pipe irrespective of the gauge or thickness of the latter.

In the modified form of Figure 5 the guide slot 27 is made arcuate and the operating element 17 is guided thereby accordingly.

For the convenience of the operator the scale may be marked "Open" and "Closed" respectively at opposite ends thereof.

I claim:

1. In combination, a pipe, a damper journaled therein, a longitudinally slotted member fixed to the outside of the pipe in proximity to the damper journal, an arm for operating the damper on the outside of the pipe, and an operating member for the arm guided in said slot.

2. In combination, a pipe, a damper journaled therein, a longitudinally slotted member fixed to the outside of the pipe in proximity to the damper journal, an arm for operating the damper on the outside of the pipe, and an operating member for the arm guided in said slot, with means for tightening the operating member upon the slotted member for locking the same.

3. In combination, a pipe, a damper journaled therein, a longitudinally slotted member fixed to the outside of the pipe in proximity to the damper journal, an arm for operating the damper on the outside of the pipe, an operating member for the arm, a bolt guided in the slot extending through a perforation in the operating member and a nut threaded on the bolt allowing the operating member to be tightened upon the slotted member.

4. In combination, a pipe, a damper journaled therein, an arm for operating the damper, an operating member for the arm, means for locking the arm and the damper against movement and independent means for locking the operating element against movement.

5. In combination, a pipe, a damper journaled therein, an arm for operating the damper, and an operating element for the arm and means for guiding the same in substantially parallel relation to the axis of the pipe.

6. An elongated bar having means for fastening the same to a pipe longitudinally, a perforation in said bar near one end thereof forming a bearing, a damper journal extending through the pipe wall and said bearing, an arm extending from the journal and held against rotation thereon, an operating member engaging the free end of the arm, a supporting guide for the operating member rising from the bar and formed with a substantially longitudinal slot, a bolt in the operating member intermediate its length having its head ride in the slot and a nut on the bolt adapted to lock the operating member against the supporting guide.

FRANK HERBERT BRYANT.